A. W. LIMONT.
METHOD OF MAKING PROJECTILE BANDS.
APPLICATION FILED JAN. 18, 1918.

1,275,057.

Patented Aug. 6, 1918.
2 SHEETS—SHEET 1.

Inventor:
Alexander W. Limont,
by his Attorney.

A. W. LIMONT.
METHOD OF MAKING PROJECTILE BANDS.
APPLICATION FILED JAN. 18, 1918.
1,275,057.
Patented Aug. 6, 1918.
2 SHEETS—SHEET 2.
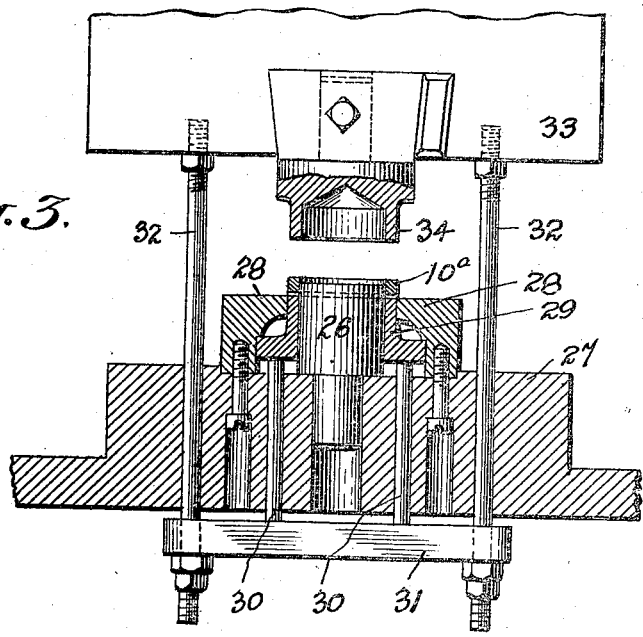
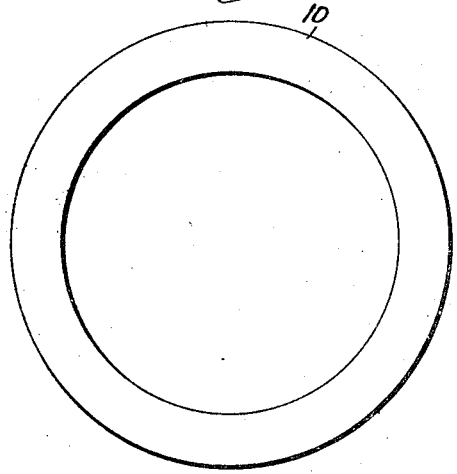
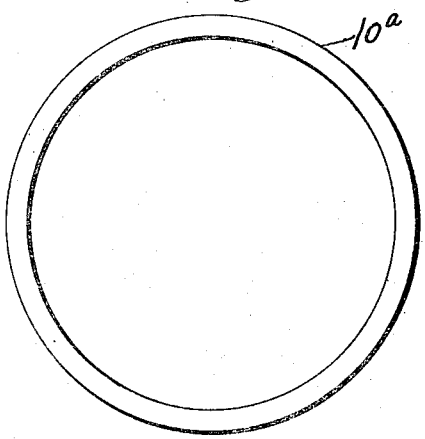
Inventor:
Alexander W. Limont,
by his Attorney.

UNITED STATES PATENT OFFICE.

ALEXANDER W. LIMONT, OF BRIDGEPORT, CONNECTICUT, ASSIGNOR TO BRIDGEPORT BRASS COMPANY, OF BRIDGEPORT, CONNECTICUT, A CORPORATION OF CONNECTICUT.

METHOD OF MAKING PROJECTILE-BANDS.

1,275,057. Specification of Letters Patent. Patented Aug. 6, 1918.

Original application filed November 5, 1915, Serial No. 59,840. Divided and this application filed January 18, 1918. Serial No. 212,470.

*To all whom it may concern:*

Be it known that I, ALEXANDER W. LIMONT, a citizen of the United States, residing in Bridgeport, county of Fairfield, and State of Connecticut, have invented certain new and useful Improvements in Methods of Making Projectile-Bands, of which the following is a full, clear, and exact description.

This invention relates to a new method for the manufacture of copper or other metallic bands for projectiles, such as shrapnel. This application is a division of my application, Serial No. 59,840, filed November 5, 1915.

In making projectile bands, the practice now followed is to draw a seamless tube to the proper size from a solid billet or a cast tubular shell, and then to place the tube in a suitable cutting off machine which cuts rings or bands therefrom, one or more at a time.

One of the primary objects of the present invention is to provide a method which is much more simple, accurate and economical than that just mentioned.

A further object of the invention is to furnish a new method whereby rings or bands of the required dimensions can be formed very quickly and accurately in large quantities by a series of very simple operations.

To these and other ends, the invention consists in the novel steps and procedure to be hereinafter described and claimed.

In the accompanying drawing:

Fig. 3 is a sectional elevation of a portion of another press, showing another operation;

Fig. 4 is an enlarged detail view of the blank; and

Fig. 5 is a similar view of the band.

Figure 1:
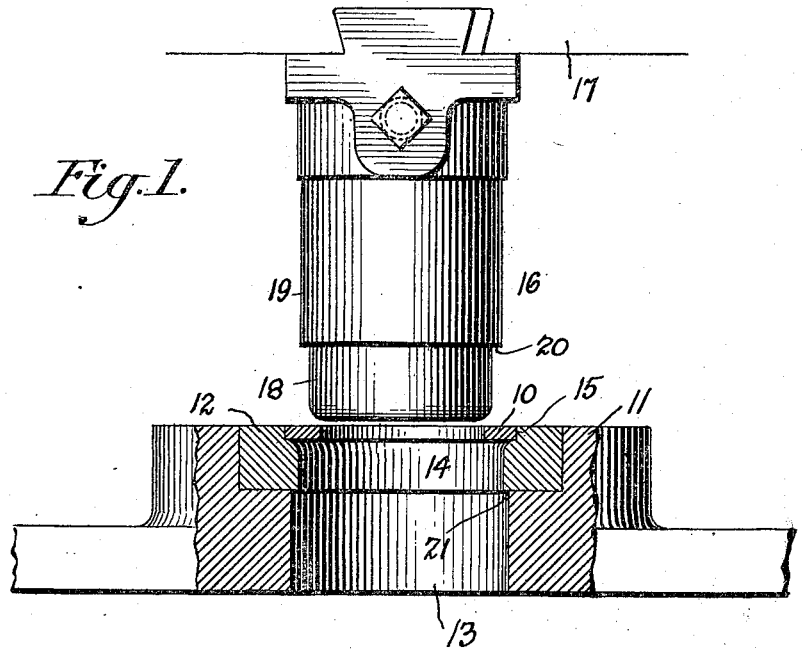
Figure 1 is a fragmentary elevation partly in section of a press used in carrying out my new method, showing the commencement of the operation.
Figure 2:
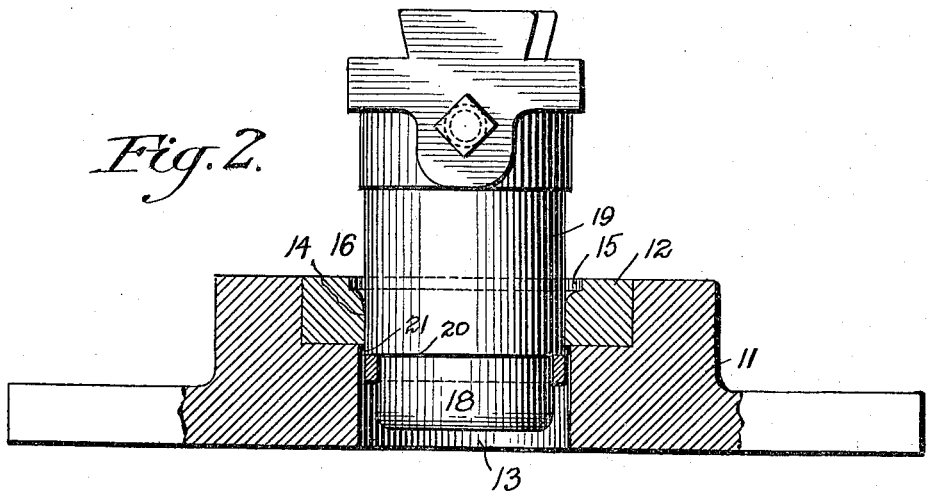
Fig. 2 is a similar view, showing a later stage of the operation.

Referring to the drawing, I use a blank 10, which is usually in the form of a washer of suitable size cut out of a flat strip or sheet of copper or like ductile material of suitable gage. The blank 10 is placed in a press, such as shown in Figs. 1 and 2, in which it is drawn to form a cylindrical band. In the example shown, the press has a bed plate 11 with a drawing die 12 mounted therein, said die being of annular shape and the bed plate having an opening 13 extending through the same in line with the opening 14 of the die, the opening 13 being slightly larger than the opening 14. The drawing die is provided with a cylindrical mouth portion 15 to receive the blank 10 snugly, and below the cylindrical mouth portion 15, the cylindrical wall of the die is of less diameter, the portions 14 and 15 being joined by an easy curve or fillet. Above the die 12 is a cylindrical drawing punch 16, mounted on a suitable crosshead or gate 17 of the press. At the lower part of the punch 16 is a cylindrical portion 18, corresponding approximately in diameter to the finished band, and above the portion 18 is a cylindrical portion 19 of larger diameter there being an annular shoulder 20 at the lower end of the portion 19. When the washer-like blank is placed in the die and the punch descends, the blank is drawn at its inner part by the portion 18 of the punch and takes up against the shoulder 20 on the punch, by means of which it is pushed entirely through the die, being changed meanwhile from the disk-like shape into a cylindrical band with substantially flat upper and lower edges. In this operation, the blank is drawn continuously from a flat washer shape through a conical shape to a cylindrical one by the application of drawing pressure, acting always from the same side of the blank, and without the necessity of changing the position of the blank in the die. I use the terms "conical" and "cone" in a broad sense, as the intermediate shape of the blank may be only approximately conical, and it will be evident also that the shape given to the blank by the dies of Figs. 1 and 2 may be only substantially cylindrical rather than exactly so. On the upstroke of the punch, the roughly formed band is stripped from the latter by the lower edge 21 of the die opening, the stripping of the band by the die being due to the fact that when the pressure upon the outer surface of the band is removed, the band expands slightly, thus preventing it from passing through the die opening as the punch moves upward. The tubular blank is, therefore, stripped off and falls out of the die through the bottom thereof. It is then placed in another press, of the type shown in Fig. 3, for the purpose of perfecting its shape, finishing its surfaces, and bringing the dimensions accurately to the required size. This press has a fixed mandrel 26 on the bed plate 27, and around the mandrel 26 is a die 28. The internal diameter of the die opening corresponds exactly to the external diameter of the finished band, and the external diameter of the mandrel corresponds exactly to the internal diameter of the finished band. A sizing sleeve 29 for compressing the blank is adapted to slide up and down between the mandrel and die, being mounted on rods 30 supported by a plate 31, which plate 31 is, in turn, supported by rods 32 from the gate 33 of the press. Another sizing sleeve 34 carried by the gate 33 is adapted to enter the space between the mandrel and die when the gate is lowered. The roughly finished blank is placed around the mandrel 26, as shown at 10ª, and on the first part of the downward movement of the press, the plate 31 is lowered, so as to let the sizing sleeve 29 down on the support 27 and thereby permit the blank 10ª to move down into the die 28. The blank is then compressed between the die and mandrel and the two sizing sleeves, so as to perfect it in shape and bring it to the required dimensions. During the operation of sizing, the internal surface of the band is supported against the mandrel, which limits inward movement of the metal and perfects the inner surface of the band, while the external surface thereof is perfected and brought to the required diameter by the coöperating cylindrical surface of the die. The sizing sleeves act on the blank in an axial direction and conform closely to the flat upper and lower edges thereof. The lower sizing sleeve being supported on the bed plate of the press, the descent of the upper sleeve causes the band to be highly compressed and to fill completely the space between the punch and mandrel. On the upstroke of the press, the gate carries upward the plate 31 and pins 30, so that the lower sizing sleeve 29 is raised. This upward movement of the lower sizing sleeve is instrumental in ejecting the finished band from the die.

Various changes in the method herein described may be made without departing from the scope of the invention as defined in the claims.

I do not claim broadly herein the method of making a projectile band which comprises continuously drawing a washer of relatively soft ductile material through a conical shape to a cylindrical shape by pressure applied from one side only of the cone, and then bringing the roughly formed band to the required internal and external diameter by compressing it axially, as claimed in my application, Serial No. 149,875, nor do I claim herein the method of sizing the band as claimed in my application Serial No. 242,401, or the press or machine for carrying out the drawing of the blank as herein described, inasmuch as said press or machine is claimed in my application Serial No. 243,427.

It will be understood that the die and die bed, in the form shown, constitute a die member having an opening therethrough with an intermediate stripping shoulder, said shoulder formed by the lower surface of the die proper.

It will be observed that the flat washer-like blank is of appreciable thickness and that the soft metal thereof is drawn while in a cold state by a continuous operation to form a cylindrical band having its inner and outer surfaces substantially parallel to each other axially of the band.

What I claim is:

1. The method of making a projectile band or the like, which comprises forming a metal washer and then drawing the washer through a die to form a cylindrical band having concentric inner and outer surfaces.

2. The method of making a projectile band, which comprises drawing a flat washer-like blank through a die while in a cold state to form a cylindrical band having inner and outer surfaces which are substantially parallel in a direction axially of the band.

3. The method of making a projectile band, which comprises drawing a flat perforated blank of soft metal of appreciable thickness through a die into cylindrical form by way of a conical form by the application of drawing pressure continuously from one side of the cone.

4. The method of making a projectile band, which comprises punching a flat washer of ductile metal of considerable thickness through a die at a single stroke to form it into a cylinder whose inner and outer surfaces are substantially parallel to each other in an axial direction.

In witness whereof, I have hereunto set my hand on the 15 day of January, 1918.

ALEXANDER W. LIMONT.

Copies of this patent may be obtained for five cents each, by addressing the "Commissioner of Patents, Washington, D. C."